(12) United States Patent
Soma

(10) Patent No.: US 8,306,681 B2
(45) Date of Patent: Nov. 6, 2012

(54) HYBRID VEHICLE, CONTROL METHOD OF HYBRID VEHICLE, AND COMPUTER READABLE RECORDING MEDIUM RECORDING PROGRAM FOR CAUSING COMPUTER TO EXECUTE CONTROL OF HYBRID VEHICLE

(75) Inventor: Takaya Soma, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 756 days.

(21) Appl. No.: 12/309,811

(22) PCT Filed: Jul. 24, 2007

(86) PCT No.: PCT/JP2007/064845
§ 371 (c)(1),
(2), (4) Date: Jan. 30, 2009

(87) PCT Pub. No.: WO2008/032494
PCT Pub. Date: Mar. 20, 2008

(65) Prior Publication Data
US 2009/0319107 A1    Dec. 24, 2009

(30) Foreign Application Priority Data

Sep. 14, 2006 (JP) ................... 2006-249230

(51) Int. Cl.
*B60L 9/00* (2006.01)
(52) U.S. Cl. ....................................................... 701/22
(58) Field of Classification Search .................. None
See application file for complete search history.

(56) References Cited

U.S. PATENT DOCUMENTS

| 6,314,347 | B1 * | 11/2001 | Kuroda et al. | 701/22 |
| 7,502,687 | B2 * | 3/2009 | Flick | 701/213 |
| 7,521,935 | B2 * | 4/2009 | Uchida | 324/426 |
| 7,784,575 | B2 * | 8/2010 | Yamanaka et al. | 180/65.275 |
| 7,847,495 | B2 * | 12/2010 | Oyobe et al. | 318/53 |
| 7,885,749 | B2 * | 2/2011 | Kamichi et al. | 701/59 |
| 2001/0032046 | A1 * | 10/2001 | Nada | 701/82 |
| 2002/0017261 | A1 * | 2/2002 | Kuroda et al. | 123/179.4 |
| 2004/0135527 | A1 | 7/2004 | Tatara et al. | |
| 2006/0152410 | A1 * | 7/2006 | Shi | 342/359 |
| 2006/0217228 | A1 * | 9/2006 | Devita et al. | 477/3 |
| 2007/0078594 | A1 * | 4/2007 | Mori | 701/207 |
| 2007/0282520 | A1 * | 12/2007 | Cradick et al. | 701/123 |
| 2008/0033620 | A1 * | 2/2008 | Kamichi et al. | 701/59 |
| 2008/0249667 | A1 * | 10/2008 | Horvitz et al. | 701/1 |

FOREIGN PATENT DOCUMENTS

| EP | 1 731 345 A1 | 12/2006 |
| JP | A-10-191510 | 7/1998 |

(Continued)

*Primary Examiner* — Thomas Tarcza
*Assistant Examiner* — Nagi Murshed
(74) *Attorney, Agent, or Firm* — Oliff & Berridge, PLC

(57) ABSTRACT

When curve determine signal from a navigation apparatus is activated, a learning portion learns driver's characteristics based on an accelerator pedal opening degree signal, and outputs the result of learning in association with a user ID from the navigation apparatus to a storage portion. A threshold value changing portion reads a learned value corresponding to the user ID from the storage portion, and based on the learned value, changes a threshold value for switching that is used by a traveling control portion. The traveling control portion switches between traveling modes based on a result of comparison between traveling power and the threshold value for switching.

16 Claims, 6 Drawing Sheets

FOREIGN PATENT DOCUMENTS

| | | |
|---|---|---|
| JP | A-2000-120460 | 4/2000 |
| JP | A-2000-166022 | 6/2000 |
| JP | A-2000-205000 | 7/2000 |
| JP | A-2001-238306 | 8/2001 |
| JP | A-2004-153929 | 5/2004 |
| JP | A-2004-222413 | 8/2004 |
| JP | A-2005-065376 | 3/2005 |
| JP | A-2005-184867 | 7/2005 |
| JP | A-2005-295690 | 10/2005 |
| JP | A-2006-174652 | 6/2006 |

* cited by examiner

| USER ID | AVERAGE ACCELERATOR PEDAL OPENING DEGREE (WHEN TRAVELING ALONG A CURVE) |
|---|---|
| 1 | a% |
| 2 | b% |
| 3 | c% |
| ⋮ | ⋮ |

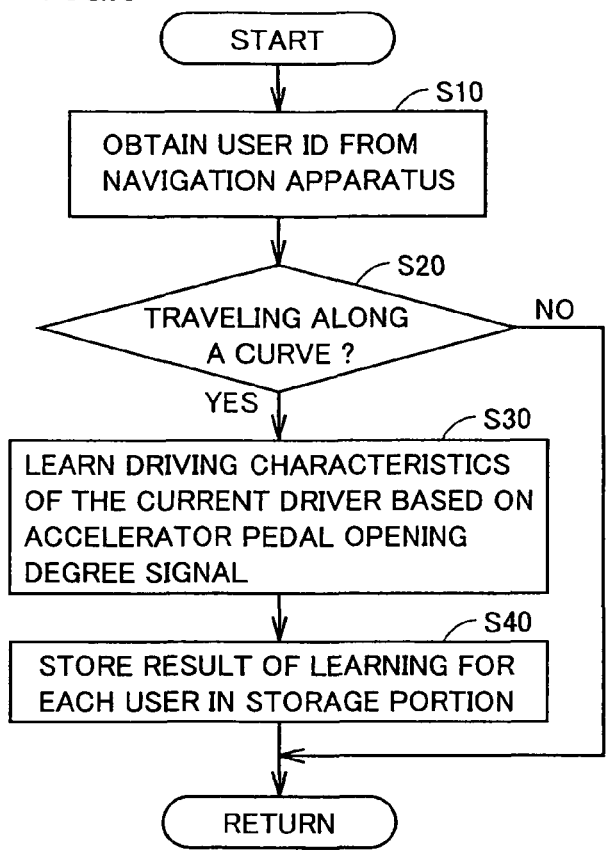
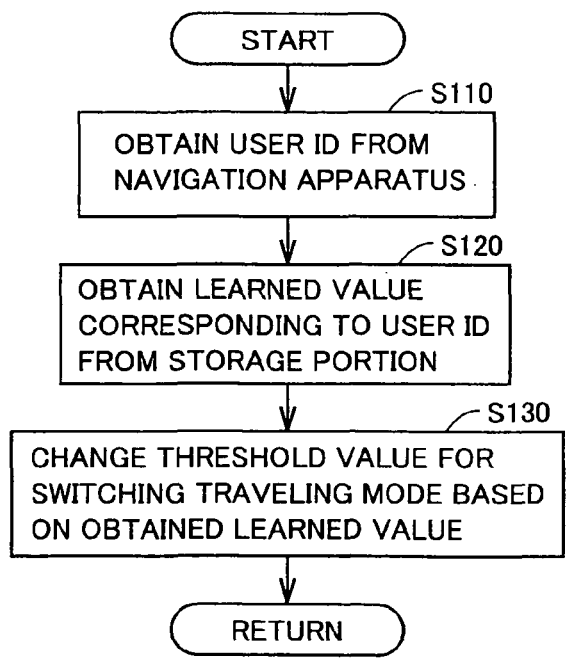

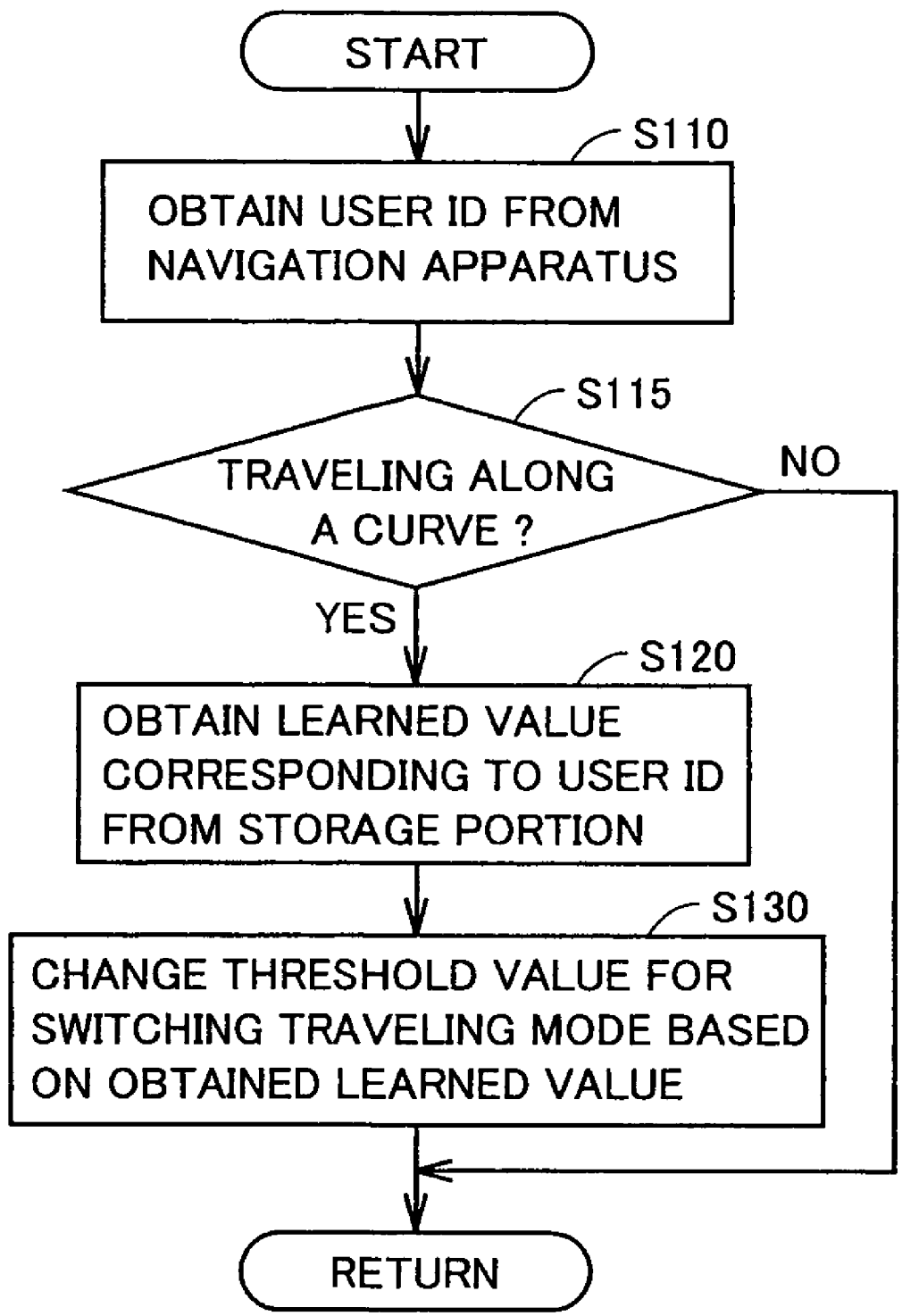

HYBRID VEHICLE, CONTROL METHOD OF HYBRID VEHICLE, AND COMPUTER READABLE RECORDING MEDIUM RECORDING PROGRAM FOR CAUSING COMPUTER TO EXECUTE CONTROL OF HYBRID VEHICLE

TECHNICAL FIELD

The present invention relates to a hybrid vehicle incorporating an internal combustion engine and an electric motor as motive power sources, a control method of a hybrid vehicle, and a computer readable recording medium recording a program for causing a computer to execute control of a hybrid vehicle.

BACKGROUND ART

In recent years, hybrid vehicles are receiving attention as environmentally friendly vehicles. As motive power sources, the hybrid vehicles incorporate, in addition to a conventional engine, a DC (Direct Current) power supply, an inverter, and a motor driven by the inverter.

With such a hybrid vehicle, the engine is started/stopped in accordance with the traveling condition of the vehicle. However, when the engine is repeatedly started/stopped frequently, the fuel efficiency becomes poor.

Japanese Patent Laying-Open No. 2000-205000 discloses a hybrid vehicle that can solve the above problem. In the hybrid vehicle, a traveling condition where acceleration/deceleration is frequently repeated is inferred, and in accordance with a result of inference, a threshold value for starting/stopping the engine is changed. According to the hybrid vehicle, unnecessary starting/stopping of the engine is prevented, and improvements in fuel efficiency and acceleration response can be achieved.

Driving characteristics are varied among the drivers. Some drivers demand acceleration feel, whereas the others demand fuel-economic driving, possibly without starting the engine even when accelerating the vehicle. On the other hand, in the hybrid vehicle disclosed by Japanese Patent Laying-Open No. 2000-205000, the threshold value of starting/stopping engine is uniformly changed according to the inference result of the traveling condition, irrespective of the driver's driving characteristics. Accordingly, there is a possibility that a traveling performance matching the driver's driving characteristics cannot be achieved.

In particular, in a hybrid vehicle in which an on-board DC power supply is chargeable using a power supply external to the vehicle (a commercial power supply), since the range where traveling is performed only by the motor while the engine is stopped is increased, there is a possibility that a driver who demands acceleration feel may feel that the power is insufficient when accelerating the vehicle.

DISCLOSURE OF THE INVENTION

Accordingly, the present invention has been made to solve such a problem, and an object thereof is to provide a hybrid vehicle that can realize the traveling performance reflecting the driving characteristics of a driver.

Another object of the present invention is to provide a control method of a hybrid vehicle that can realize a traveling performance reflecting the driver's driving characteristics.

Still another object of the present invention is to provide a computer readable recording medium that records a program for causing a computer to execute control of a hybrid vehicle that can realize a traveling performance reflecting the driver's driving characteristics.

According to the present invention, a hybrid vehicle incorporates an internal combustion engine and an electric motor as motive power sources, and is capable of switching, in accordance with a traveling state of the vehicle, between a first traveling mode (EV mode) where traveling is performed while the internal combustion engine is stopped and a second traveling mode (HV mode) where traveling is performed while the internal combustion engine and the electric motor are operated. The hybrid vehicle includes: a user setting portion for setting a driver; a learning portion; and a changing portion. The learning portion learns driving characteristics during traveling for each driver set by the user setting portion. The changing portion changes a threshold value for switching between the first and the second traveling modes in accordance with the driver being set by the user setting portion, based on a result of learning of the learning portion.

Preferably, the hybrid vehicle further includes a navigation apparatus capable of detecting a traveling location of the vehicle. The navigation apparatus includes a determining portion for determining whether or not the vehicle is in a traveling condition where acceleration or deceleration is expected. The changing portion changes the threshold value for switching, when it is determined that the vehicle is in the traveling condition where acceleration or deceleration is expected.

Further preferably, the determining portion determines whether or not the vehicle is in the traveling condition where acceleration or deceleration is expected, based on a curve degree of a course of the vehicle.

Preferably, the learning portion learns the driver's driving characteristics, when it is determined that the vehicle is in the traveling condition where acceleration or deceleration is expected.

Preferably, the learning portion learns an opening degree of an accelerator pedal operated by the driver. The changing portion changes the threshold value for switching so that a range in which traveling is performed in the second traveling mode is increased as a learned value of the learning portion is greater.

Further preferably, the learning portion learns an opening degree of an accelerator pedal operated by the driver. The changing portion changes the threshold value for switching so that a range in which traveling is performed in the first traveling mode is increased as a learned value of the learning portion is smaller.

The present invention is a control method of a hybrid vehicle incorporating an internal combustion engine and an electric motor as motive power sources and being capable of switching, in accordance with a traveling state of the vehicle, between a first traveling mode (EV mode) where traveling is performed while the internal combustion engine is stopped and a second traveling mode (HV mode) where traveling is performed while the internal combustion engine and the electric motor are operated. The method includes: a first step of learning driving characteristics during traveling for each driver; and a second step of changing a threshold value for switching between the first and the second traveling modes in accordance with the driver, based on a result of such learning.

Preferably, the control method further includes a third step of determining whether or not the vehicle is in a traveling condition where acceleration or deceleration is expected. When it is determined that the vehicle is in the traveling condition where acceleration or deceleration is expected, the threshold value for switching is changed in the second step.

Further preferably, in the third step, whether or not the vehicle is in the traveling condition where acceleration or deceleration is expected is determined based on a curve degree of a course of the vehicle.

Preferably, when it is determined that the vehicle is in the traveling condition where acceleration or deceleration is expected, the driving characteristics are learned in the first step.

Preferably, in the first step, an opening degree of an accelerator pedal operated by the driver is learned. In the second step, the threshold value for switching is changed so that a range in which traveling is performed in the second traveling mode is increased as a learned value indicative of such learning is greater.

Further preferably, in the first step, an opening degree of an accelerator pedal operated by the driver is learned. In the second step, the threshold value for switching is changed so that a range in which traveling is performed in the first traveling mode is increased as a learned value indicative of such learning is smaller.

According to the present invention, a computer readable recording medium records a program for causing a computer to execute any control described above.

In the present invention, a hybrid vehicle incorporates an internal combustion engine and an electric motor as motive power sources, and is capable of switching, in accordance with a traveling state of the vehicle, between a first traveling mode (EV mode) where traveling is performed while the internal combustion engine is stopped and a second traveling mode (HV mode) where traveling is performed while the internal combustion engine and the electric motor are operated. Driving characteristics during traveling are learned for each driver. Based on a result of learning, a threshold value for switching between the first and the second traveling modes is changed in accordance with the driver. Therefore, the driving characteristics for each driver are reflected on the timing for switching between the first and second traveling modes.

Therefore, according to the present invention, the traveling performance reflecting the driver's driving characteristics for each driver can be realized. As a result, the traveling needs of the drivers can fully be satisfied. Also, unnecessary switching of traveling mode is suppressed, and an improvement in fuel efficiency is attained.

BRIEF DESCRIPTION OF THE DRAWINGS

FIG. 5 is a flowchart related to learning of driver's driving characteristics by the ECU shown in FIG. 1.

FIG. 6 is a flowchart related to changing of a threshold value for switching traveling mode by the ECU shown in FIG. 1.

FIG. 9 is a flowchart related to changing of a threshold value for switching traveling mode by an ECU in a variation.

BEST MODES FOR CARRYING OUT THE INVENTION

Figure 1:
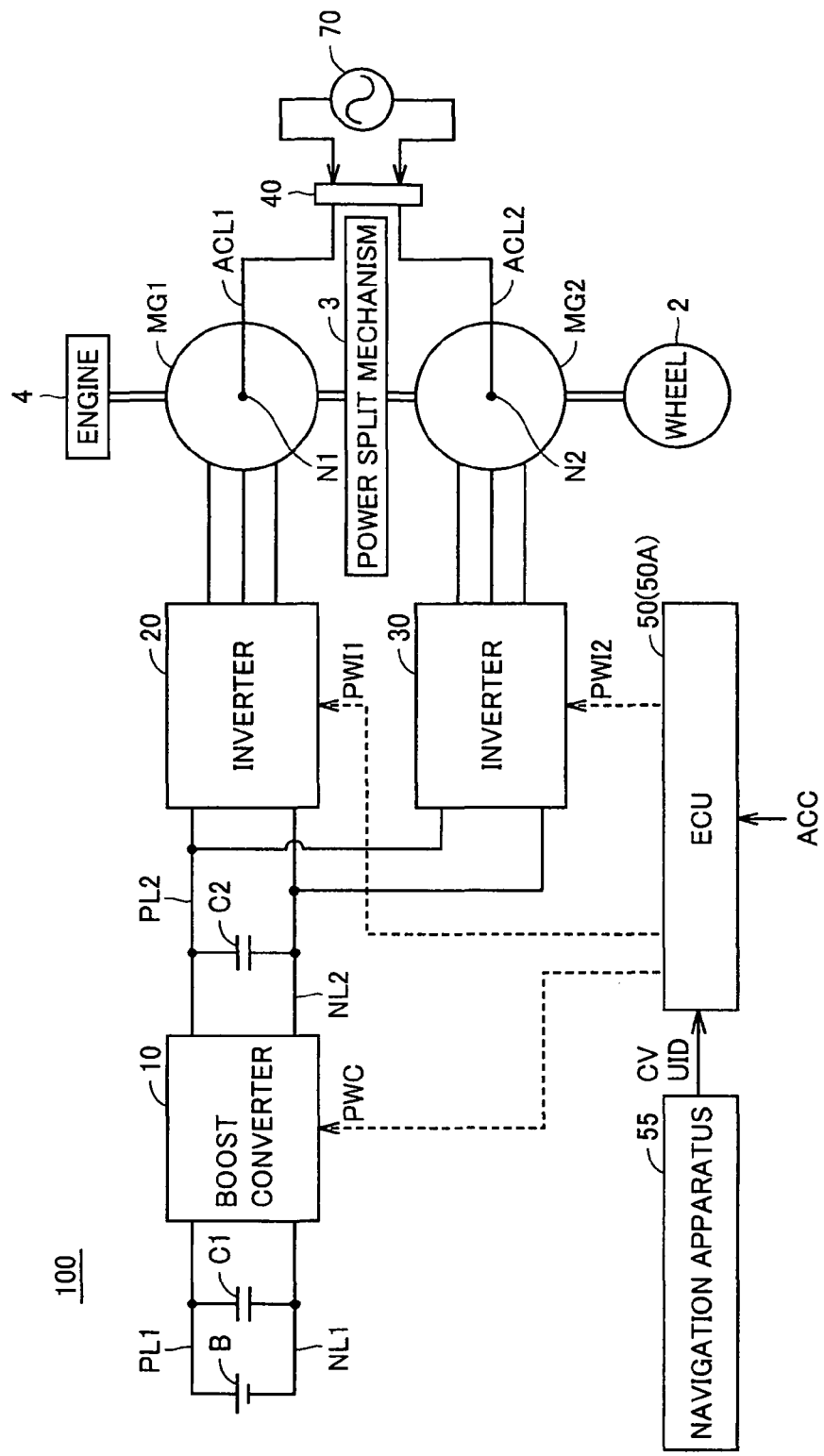
FIG. 1 is an overall block diagram of a hybrid vehicle according to an embodiment of the present invention.

In the following, an embodiment of the present invention is described referring to the drawings. In the drawings, the same or corresponding parts are denoted by the same reference character, and description thereof is not repeated.

FIG. 1 is an overall block diagram of a hybrid vehicle according to an embodiment of the present invention. Referring to FIG. 1, a hybrid vehicle 100 includes an engine 4, motor-generators MG1, MG2, a power split mechanism 3, and wheels 2. Hybrid vehicle 100 further includes a power storage apparatus B, a boost converter 10, inverters 20, 30, a connector 40, an ECU (Electronic Control Unit) 50, a navigation apparatus 55, capacitors C1, C2, positive electrode lines PL1, PL2, and negative electrode linens NL1, NL2.

Power split mechanism 3 is linked to engine 4 and motor-generators MG1, MG2 for distributing motive power among them. For example, as power split mechanism 3, a planetary gear having three rotation shafts of a sun gear, a planetary carrier, and a ring gear can be used. These three rotation shafts are connected to the rotation shafts of engine 4, and motor-generators MG1, MG2, respectively. For example, by inserting the crankshaft of engine 4 through the center of a hollow rotor of motor-generator MG1, engine 4 and motor-generators MG1, MG2 can mechanically be connected to power split mechanism 3.

Motor-generator MG1 is incorporated in hybrid vehicle 100 as an element that operates as a generator driven by engine 4 and that operates as an electric motor that can start engine 4. Motor-generator MG2 is incorporated in hybrid vehicle 100 as an electric motor that drives wheels 2 that are the driving wheels.

The positive electrode of power storage apparatus B is connected to positive electrode line PL1, and the negative electrode of power storage apparatus B is connected to negative electrode line NL1. Capacitor C1 is connected between positive electrode line PL1 and negative electrode line NL1. Boost converter 10 is connected between positive and negative electrode lines PL1, NL1 and positive and negative electrode lines PL2, NL2. Capacitor C2 is connected between positive electrode line PL2 and negative electrode line NL2. Inverter 20 is connected between positive and negative electrode lines P, NL2 and motor-generator MG1. Inverter 30 is connected between positive and negative electrode lines PL2, NL2 and motor-generator MG2.

Motor-generator MG1 includes not-shown Y-connected three-phase coils as stator coils, and is connected to inverter 20 via three-phase cables. Motor-generator MG2 similarly includes not-shown Y-connected three-phase coils as stator coils, and is connected to inverter 30 via three-phase cables. A power input line ACL1 is connected to a neutral point N1 of the three-phase coils of motor-generator MG1, and a power input line ACL2 is connected to a neutral point N2 of the three-phase coils of motor-generator MG2.

Power storage apparatus B is a chargeable DC power supply, configured with a secondary battery such as a nickel-hydride battery, a lithium-ion battery or the like, for example. Power storage apparatus B outputs DC power to boost converter 10. Power storage apparatus B receives power output from boost converter 10 and charged. It is to be noted that a capacitor of a large capacitance can be used as power storage apparatus B. Capacitor C1 smoothes the voltage variation across positive electrode line PL1 and negative electrode line NL1.

Based on a signal PWC from ECU 50, boost converter 10 boosts a DC voltage output from power storage apparatus B and outputs the same to positive electrode line PL2. Based on signal PWC, boost converter 1 steps down a DC voltage output from inverters 20, 30 to a voltage level of power storage apparatus B, and charges power storage apparatus B. Boost converter 10 is configured with a boost-buck chopper circuit, for example.

Capacitor C2 smoothes the voltage variation across positive electrode line PL2 and negative electrode line NL2. Based on a signal PWI1 from ECU 50, inverter 20 converts a DC voltage received from positive electrode line PL2 into a three-phase AC (Alternating Current) voltage, and outputs the same to motor-generator MG1. Thus, motor-generator MG1 is driven so as to generate specified torque. Based on signal PWI1, inverter 20 converts a three-phase AC voltage generated by motor-generator MG1 using the motive power of engine 4 into a DC voltage, and outputs the same to positive electrode line PL2.

Based on a signal PWI2 from ECU 50, inverter 30 converts a DC voltage received from positive electrode line PL2 into a three-phase AC voltage, and outputs the same to motor-generator MG2. Thus, motor-generator MG2 is driven so as to generate specified torque. In regenerative braking of the vehicle, based on signal PWI2, inverter 30 converts a three-phase AC voltage generated by motor-generator MG2 receiving the rotation force of wheels 2 into a DC voltage, and outputs the same to positive electrode line PL2.

When power storage apparatus B is charged from an external power supply 70 connected to a connector 40, based on signals PWI1, PWI2, inverters 20, 30 convert the commercial power, which is supplied from external power supply 70 via power input lines ACL1, ACL2 to neutral points N1, N2, into DC power, and output the converted DC power to positive electrode line PL2.

Motor-generators MG1, MG2 are three-phase AC motors, and formed by three-phase AC synchronous motors, for example. Motor-generator MG1 generates a three-phase AC voltage using motive force of engine 4, and outputs the generated three-phase AC voltage to inverter 20. Motor-generator MG1 generates drive force by a three-phase AC voltage received from inverter 20, and starts engine 4. Motor-generator MG2 generates driving torque of the vehicle by a three-phase AC voltage received from inverter 30. Motor-generator MG2 generates a three-phase AC voltage in regenerative braking of the vehicle, and outputs the same to inverter 30.

ECU 50 generates signal PWC for driving boost converter 10 and signals PWI1, PWI2 for respectively driving inverters 20, 30, and outputs generated signals PWC, PWI1, PWI2 to boost converter 10 and inverters 20, 30, respectively.

Here, ECU 50 calculates traveling power based on an accelerator pedal opening degree signal ACC indicative of an accelerator pedal opening degree and on a traveling state of the vehicle, and controls traveling mode of hybrid vehicle 100 based on the calculated traveling power. The traveling mode includes EV mode where traveling is performed while stopping engine 4 to use motor-generator MG2 solely as the motive power source, and HV mode where traveling is performed while driving engine 4 to use engine 4 and motor-generator MG2 as motive power sources. When the traveling power exceeds a threshold value, ECU 50 sets the traveling mode to HV mode. Specifically, ECU 50 starts engine 4. On the other hand, when the traveling power becomes smaller than the threshold value, ECU 50 sets the traveling mode to EV mode. Specifically, ECU 50 stops engine 4.

Furthermore, ECU 50 learns driving characteristics during traveling for each driver set in a navigation apparatus 55, which will be described later. Based on the result of learning, ECU 50 changes a threshold value for switching traveling mode in accordance with the driver. Specifically, ECU 50 learns, for each driver, an accelerator pedal opening degree when traveling along a curve, where the driver's driving characteristics significantly appear. Based on the result of learning, ECU 50 changes a threshold value for switching traveling mode in accordance with the driver.

When power storage apparatus B is charged from external power supply 70, ECU 50 generates signals PWI1, PWI2 for controlling inverters 20, 30 so that they convert the commercial power supplied from external power supply 70 via power input lines ACL1, ACL2 to neutral points N1, N2 into DC power and output the same to positive electrode line PL2.

Navigation apparatus 55 determines whether or not the vehicle is in a traveling situation where deceleration or acceleration is expected, based on a location of the vehicle and a road map. Specifically, navigation apparatus 55 determines, based on a vehicle location and a road map, whether or not the vehicle is traveling along a curve. When navigation apparatus 55 determines that the vehicle is traveling along a curve, navigation apparatus 55 activates a curve determine signal CV output to ECU 50. Whether or not the vehicle is traveling along a curve is determined based on a curve degree (curve radius) of the course.

Navigation apparatus 55 has a setting portion for accepting an input of setting the driver who is driving the vehicle, and outputs, to ECU 50, a user ID (UID) corresponding to the set driver.

Figure 2:
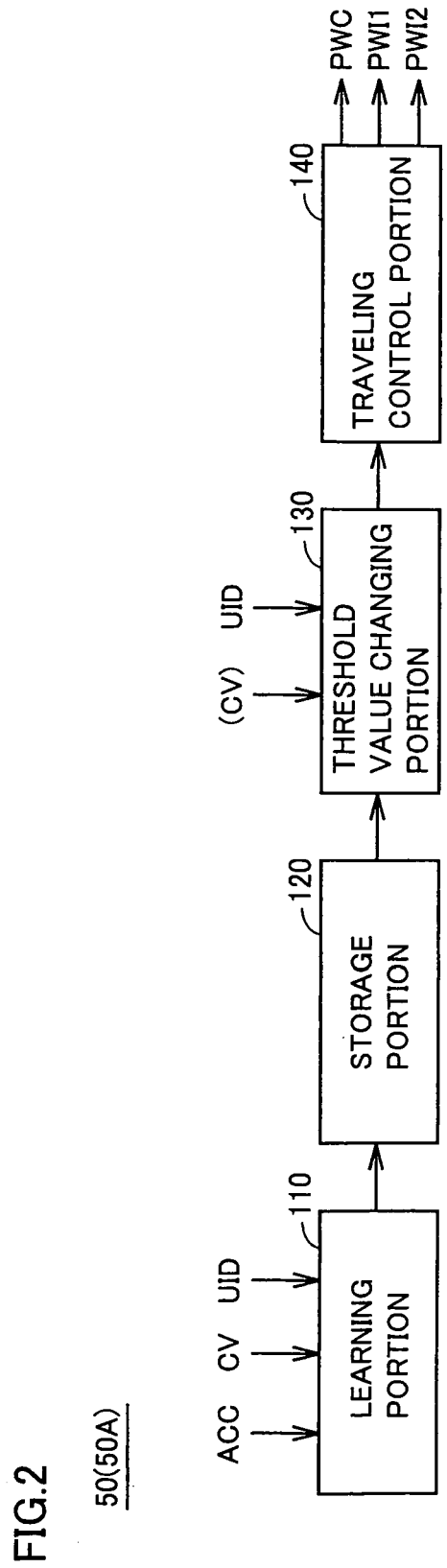
FIG. 2 is a functional block diagram of an ECU shown in FIG. 1.

FIG. 2 is a functional block diagram of ECU 50 shown in FIG. 1. Referring to FIG. 2, ECU 50 includes a learning portion 110, a storage portion 120, a threshold value changing portion 130, and a traveling control portion 140.

When curve determine signal CV from navigation apparatus 55 is activated, learning portion 110 learns the driver's driving characteristics during traveling, and associates the result of learning with user ID (UID) from navigation apparatus 55 and outputs the same to storage portion 120. Specifically, learning portion 110 calculates an average value of accelerator pedal opening degree signal ACC when curve determine signal CV is activated, and employs the calculated average value as the learned value of the driver's driving characteristics.

Figures 3, 4:
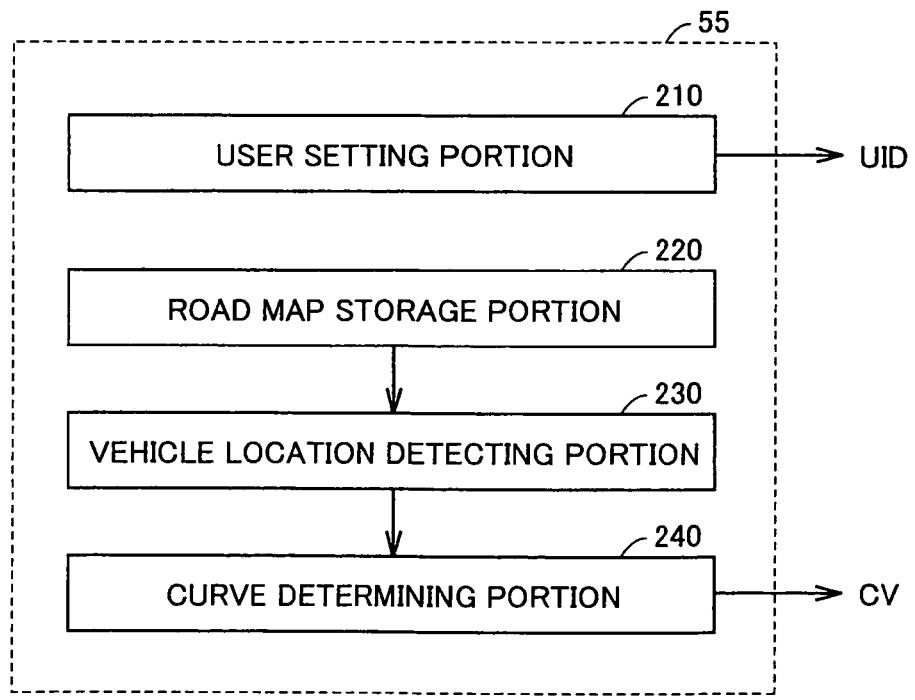
FIG. 3 shows a data structure of a storage portion shown in FIG. 2.
FIG. 4 is a functional block diagram of a navigation apparatus shown in FIG. 1.

Storage portion 120 stores the learned value for each user ID (UID). That is, as shown in FIG. 3, storage portion 120 stores an average accelerator pedal opening degree for each driver (when traveling along a curve) in association with user ID (UID).

Referring to FIG. 2 again, threshold value changing portion 130 obtains from storage portion 120 a learned value corresponding to user ID (UID) from navigation apparatus 55. According to the obtained learned value, threshold value changing portion 130 changes a threshold value for switching used for switching traveling mode in traveling control portion 140. Specifically, as the obtained learned value (average value of the accelerator pedal opening degree) is greater, threshold value changing portion 130 changes the threshold value for switching to be smaller so that the range where traveling is performed in HV mode is increased. As the obtained learned value is smaller, threshold value changing portion 130 changes the threshold value for switching to be greater so that the range where traveling is performed in EV mode is increased.

Traveling control portion 140 calculates traveling power based on the accelerator pedal opening degree and the traveling state. Based on the result of comparison between the calculated traveling power and the threshold value for switching, traveling control portion 140 switches the traveling mode of the vehicle. That is, when the calculated traveling power is greater than the threshold value for switching, traveling control portion 140 sets the traveling mode to HV mode and starts engine 4. On the other hand, when the calculated traveling power is smaller than the threshold value for switching, traveling control portion 140 sets the traveling mode to EV mode and stops engine 4.

Traveling control portion 140 calculates a torque command for each of motor-generators MG1, MG2 based on the calculated traveling power and the traveling mode, and generates signals PWC, PWI1, PWI2 based on the calculated torque commands.

FIG. 4 is a functional block diagram of navigation apparatus 55 shown in FIG. 1. Referring to FIG. 4, navigation apparatus 55 includes a user setting portion 210, a road map storage portion 220, a vehicle location detecting portion 230, and a curve determining portion 240.

User setting portion 210 allows setting of the driver who is driving, and outputs to ECU 50 a user ID (UID) that corresponds to the set driver. Road map storage portion 220 is configured by a storage medium such as DVD (Digital Versatile Disk), hard disk, ROM (Read Only Memory) or the like, and stores map data including information related to the curve degree (curve radius) of the course. In response to a request from vehicle location detecting portion 230, road map storage portion 220 outputs map data to vehicle location detecting portion 230.

Vehicle location detecting portion 230 detects the current location of hybrid vehicle 100, and outputs location information related to the detected current location along with the map data from road map storage portion 220 to curve determining portion 240. As to the detection scheme of the vehicle location, known schemes using GPS (Global Positioning System) that measures the vehicle location utilizing an artificial satellite can be employed.

Based on the map data of road map storage portion 220 and the location information from vehicle location detecting portion 230, curve determining portion 240 determines whether or not hybrid vehicle 100 is traveling along a curve. Specifically, when a curve radius of the road on which the vehicle is currently traveling is not smaller than a prescribed value, curve determining portion 240 determines that the vehicle is traveling along a curve, and activates curve determine signal CV being output to ECU 50.

FIG. 5 is a flowchart related to learning of driver's driving characteristics by ECU 50 shown in FIG. 1. The processing shown in the flowchart is called from a main routine for a certain time period or every time a prescribed condition is satisfied, and executed.

Referring to FIG. 5, ECU 50 obtains from navigation apparatus 55 user ID (UID) set in navigation apparatus 55 (step S10). Next, when ECU 50 determines that hybrid vehicle 100 is traveling along a curve, based on curve determine signal CV from navigation apparatus 55 (YES in step S20), ECU 50 learns driving characteristics of the current driver indicated by user ID (UID), based on accelerator pedal opening degree signal ACC (step S30). ECU 50 stores the result of learning of the driving characteristics in association with user 11D in storage portion 120 (step S40).

When it is determined that the vehicle is not traveling along a curve in step S20, ECU 50 ends the series of processes without executing the processes of steps S30 and S40.

FIG. 6 is a flowchart related to changing of the threshold value for switching traveling mode by ECU 50 shown in FIG. 1. The processing shown in the flowchart is also called from a main routine for a certain time period or every time a prescribed condition is satisfied, and executed.

Referring to FIG. 6, ECU 50 obtains from navigation apparatus 55 user ID (UID) set in navigation apparatus 55 (step S110). Next, ECU 50 obtains from storage portion 120 a learned value corresponding to the obtained user ID (step S120).

Then, based on the obtained learned value, ECU 50 changes the threshold value for switching traveling mode (step S130). Specifically, as to the switching of traveling mode that is performed based on a result of comparison between the traveling power and the threshold value for switching, ECU 50 changes the threshold value for switching to be smaller (so that the range in which traveling is performed in HV mode is increased) as the learned value being an average value of accelerator pedal opening degree is greater. ECU 50 changes the threshold value for switching to be greater (so that the range in which traveling is performed in EV mode is increased) as the learned value is smaller.

Figure 7:
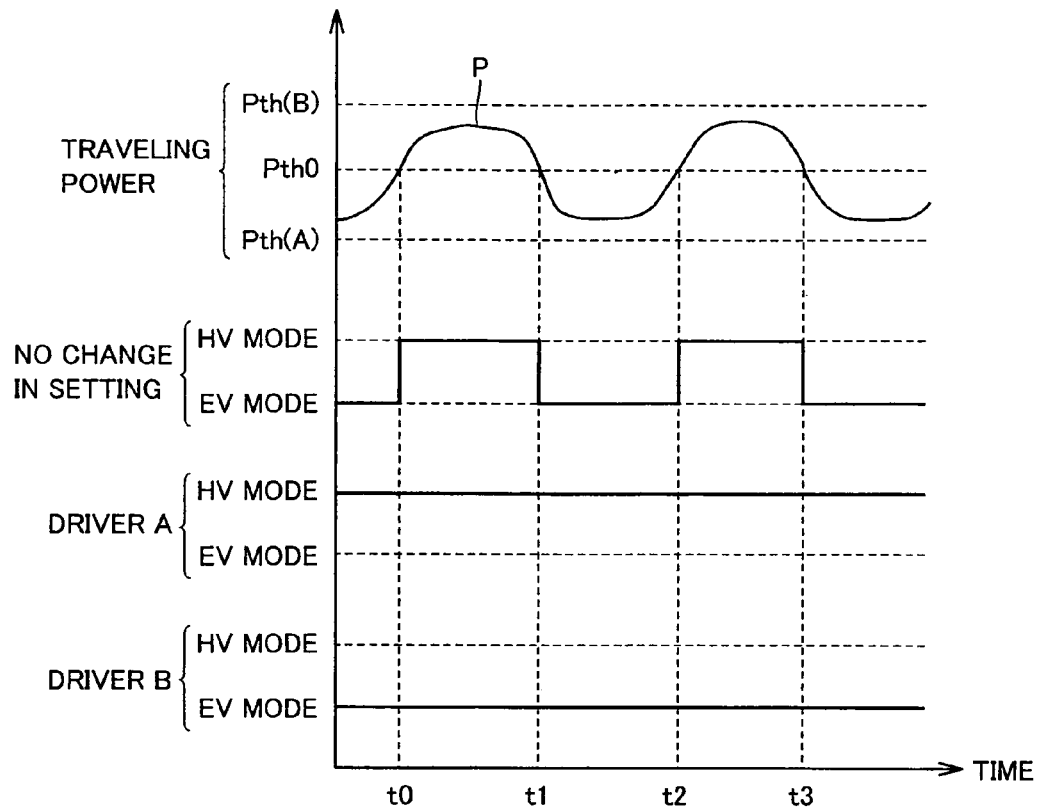
FIG. 7 is an illustration for describing switching of traveling mode.

FIG. 7 is an illustration for describing switching of traveling mode. Referring to FIG. 7, a curve line P indicates changes over time of traveling power calculated based on the accelerator pedal opening degree and the traveling state. Pth (A), Pth(B) respectively indicate threshold values for switching corresponding to drivers A, B. Pth0 indicates a threshold value for switching when a user is not set (a default value).

Driver A is a driver who demands acceleration feel. Based on the result of learning of driving characteristics of driver A, threshold value (A) for switching has been changed to a value smaller than Pth0. On the other hand, driver B is a driver who demands fuel-economic driving. Based on the result of learning of driving characteristics of driver B, threshold value (B) for switching has been changed to a value greater than Pth0.

When the threshold value for switching is Pth0 (as conventionally), at time point t0 where traveling power P exceeds threshold value Pth0 for switching, the traveling mode is switched from EV mode to HV mode. At time point t1 where traveling power P becomes smaller than threshold value Pth0 for switching, the traveling mode is switched from HV mode to EV mode. Similar switching of traveling mode occurs also at time points t2, t3.

Here, when driver A is set as the user, that is, when the threshold value for switching is Pth(A), traveling power P does not become smaller than threshold value (A) for switching. Therefore, the traveling mode is always HV mode. Accordingly, hybrid vehicle 100 can realize the traveling performance reflecting the driving characteristics of driver A who demands acceleration feel.

On the other hand, when driver B is set as the user, that is, when the threshold value for switching is Pth(B), traveling power P does not become greater than threshold value (B) for switching. Therefore, the traveling mode is always EV mode. Accordingly, hybrid vehicle 100 can realize the traveling performance reflecting the driving characteristics of driver B who demands fuel-economic driving.

In hybrid vehicle 100, as described above, power storage apparatus B can be charged from external power supply 70. In the following, a method of charging power storage apparatus B from external power supply 70 is briefly described.

Figure 8:
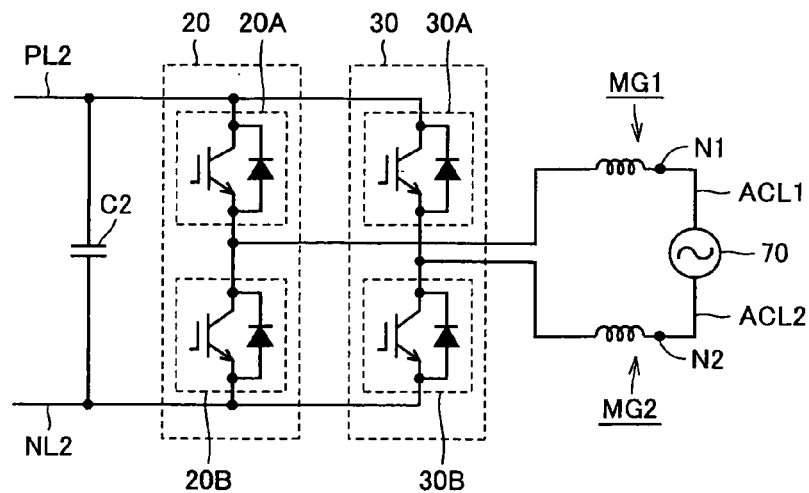
FIG. 8 shows a zero-phase equivalent circuit of inverters and motor-generators shown in FIG. 1.

FIG. 8 is a zero-phase equivalent circuit of inverters 20, 30 and motor-generators MG1, MG2 shown in FIG. 1. In each of inverters 20, 30 being three-phase inverters, there are eight patterns of on/off combinations of six transistors. Two of the eight switching patterns provide zero voltage between the phases. Such a voltage state is referred to as zero voltage vector. The zero voltage vector can be understood that the three transistors of the upper arm are in the same switching state (all on or off), and similarly, the three transistors of the lower arm are in the same switching state. Accordingly, in FIG. 8, the three transistors of the upper arm of inverter 20 are collectively shown as upper arm 20A, and the three transistors of the lower arm of inverter 20 are collectively shown as lower arm 20B. Similarly, the three transistors of the upper arm of inverter 30 are collectively shown as upper arm 30A, and the three transistors of the lower arm of inverter 30 are collectively shown as lower arm 30B.

As shown in FIG. 8, the zero-phase equivalent circuit can be regarded as a single-phase PWM converter which accepts input of single-phase AC commercial power provided to neutral points N1, N2 via power input lines ACL1, ACL2. Accordingly, by changing the zero voltage vector in each of inverters 20, 30 and switch-controlling inverters 20, 30 so that they operate as respective phase arms of the single-phase PWM converter, the AC commercial power input from power input lines ACL1, ACL2 can be converted into DC power and output to positive electrode line PL2.

Such a hybrid vehicle in which an on-board power storage apparatus is chargeable from an external power supply basically travels in EV mode. On the other hand, a driver who demands acceleration feel may strongly feel that the power is insufficient when accelerating the vehicle. Now, in hybrid vehicle 100, the threshold value for switching traveling mode is changed in accordance with the driver's driving characteristics as described above, and therefore traveling performance reflecting the driving characteristics of the driver who demands acceleration feel can be realized.

As described above, in the present embodiment, the driving characteristics during traveling are learned for each driver. Based on the result of learning, the threshold value for switching traveling mode (EV mode and HV mode) is changed in accordance with the driver. Therefore, the driver's driving characteristics are reflected on the timing of switching traveling mode. Thus, according to the present embodiment, the traveling performance reflecting the driving characteristics for each driver can be realized. As a result, the needs of the drivers are fully satisfied. Additionally, unnecessary switching of traveling mode is suppressed, and an improvement in the fuel efficiency can also be attained.

[Variation]

Originally, the threshold value for switching traveling mode is set to an appropriate value at the design stage, in light of the fuel efficiency, acceleration performance and the like. Accordingly, when the threshold value for switching is changed based on the driver's driving characteristics, the fuel efficiency may become very poor. Therefore, in this variation, the threshold value for switching traveling mode is changed based on the result of learning of the driver's driving characteristics only when the vehicle is traveling along a curve, where the driver's driving characteristics significantly appear.

FIG. 9 is a flowchart related to changing of the threshold value for switching traveling mode by ECU 50A of the present variation. The processing shown in the flowchart is also called from a main routine for a certain time period or every time a prescribed condition is satisfied, and executed.

Referring to FIG. 9, the flowchart is different from the flowchart of FIG. 6 in that it further includes step S115. That is, when ECU 50A determines that hybrid vehicle 100 is traveling along a curve, based on curve determine signal CV from navigation apparatus 55 (YES in step S115), it goes to step S120 and steps that follow and changes the threshold value for switching traveling mode.

On the other hand, when it is determined that the vehicle is not traveling along a curve in step S115 (NO in step S115), ECU 50A ends the series of the processes without changing the threshold value for switching. That is, default threshold value for switching Pth0 is set as the threshold value for switching.

As described above, in the present variation, only when the vehicle is traveling along a curve where the driver's driving characteristics significantly appear, the threshold value for switching traveling mode is changed based on the result of learning of the driver's driving characteristics. When the vehicle is not traveling along a curve, a default threshold value for switching set at the designing stage in light of the fuel efficiency, acceleration performance and the like is set. Therefore, according to the present variation, when the vehicle is traveling along a curve, the traveling performance reflecting the driver's driving performance can be realized for each driver, and when not traveling along a curve, switching of traveling mode that may invite poor fuel efficiency can be prevented.

In the foregoing embodiment, it has been described that the determination as to whether or not the vehicle is traveling along a curve is made based on the curve degree (curve radius) of the course. However, the curve determination can be made based on the rudder angle (or the steering wheel manipulation angle) of the vehicle, for example.

Also, while it has been described that the driving characteristics are learned using data (an accelerator pedal opening degree) when the vehicle is traveling along a curve where the driver's driving characteristics significantly appear, such data used for learning may include an accelerator pedal opening degree when the vehicle is started, since the driver's driving characteristics also appear significantly when the driver starts the vehicle. Furthermore, while it has been described that the driver's driving characteristics are learned based on an accelerator pedal opening degree, the learning data is not limited to the accelerator pedal opening degree, so long as it reflects the driver's driving characteristics. For example, the driving characteristics can be learned based on traveling power or traveling torque calculated based on the accelerator pedal opening degree and the traveling state of the vehicle.

Furthermore, while it has been described that traveling mode is switched based on the result of comparison between the traveling power and the threshold value for switching, the traveling mode may be switched based on the result of comparison between accelerator pedal opening degree or traveling torque and a corresponding threshold value for switching. As to the threshold value for switching traveling mode, there may be an offset between a threshold value where EV mode is switched to HV mode (that is, the threshold value for starting engine 4) and the threshold value where HV mode is switched to EV mode (that is, the threshold value for stopping engine 4).

While it has been described that power from external power supply 70 is provided via power input lines ACL1, ACL2 to neutral points N1, N2 so that inverters 20, 30 and motor-generators MG1, MG2 are operated as a single-phase PWM converter, and whereby power storage apparatus B is charged from external power supply 70, it is also possible to separately provide a dedicated converter for charging power storage apparatus B from external power supply 70.

While it has been described that the hybrid vehicle of what is called series/parallel type in which motive power of engine 4 is distributed for motor-generator MG1 and wheels 2 using power split mechanism 3, the present invention is also applicable to a what is called series type hybrid vehicle where the motive power of engine 4 is used only for generation by motor-generator MG1 and drive force is generated by using only motor-generator MG2. Furthermore, the applicable range of the present invention is not limited to a hybrid vehicle in which an on-board power storage apparatus can be charged from an external power supply. Instead, the present invention is also applicable to a hybrid vehicle that does not have a charging function from an external power supply.

In the foregoing description, the processes by ECU50/50A are actually performed by a CPU (Central Processing Unit). The CPU reads a program including each step in the foregoing flowcharts from ROM (Read Only Memory), executes the read program thereby executing the processes according to the flowcharts. Accordingly, the ROM corresponds to a computer (CPU) readable recording medium recording a program including each step in the foregoing flowcharts.

In the foregoing, engine 4 corresponds to "an internal combustion engine" of the present invention, and motor-generator MG2 corresponds to "an electric motor" of the present invention. Threshold value changing portion 130 of ECU 50 corresponds to "a changing portion" of the present invention, and curve determining portion 240 of navigation apparatus 55 corresponds to "a determining portion" of the present invention.

It should be understood that the embodiment disclosed herein is illustrative and non-restrictive in every respect. The scope of the present invention is defined by the terms of the claims, rather than the embodiment above, and is intended to include any changes within the meaning and scope equivalent to the terms of the claims.

The invention claimed is:

1. A hybrid vehicle, incorporating an internal combustion engine and an electric motor as motive power sources, and being capable of switching, in accordance with a traveling state of the vehicle, between a first traveling mode where traveling is performed while said internal combustion engine is stopped and a second traveling mode where traveling is performed while said internal combustion engine and said electric motor are operated, comprising:
 a user setting portion configured to accept an input so as to identify a driver of the vehicle; and
 a control apparatus that learns driving characteristics during traveling for each driver set by said user setting portion, and that changes a threshold value for switching between said first traveling mode and said second traveling mode in accordance with the driver being set by said user setting portion, based on a result of such learning.

2. The hybrid vehicle according to claim 1, further comprising
 a navigation apparatus capable of detecting a traveling location of the vehicle, wherein
 said navigation apparatus includes a determining portion determining whether or not the vehicle is in a traveling condition where acceleration or deceleration is expected, and
 said control apparatus changes said threshold value for switching, when it is determined by said determining portion that the vehicle is in said traveling condition.

3. The hybrid vehicle according to claim 2, wherein
 said determining portion determines whether or not the vehicle is in said traveling condition, based on a curve degree of a course of the vehicle.

4. The hybrid vehicle according to claim 2, wherein
 said control apparatus learns said driving characteristics, when it is determined that the vehicle is in said traveling condition.

5. The hybrid vehicle according to claim 1, wherein
 said control apparatus learns an opening degree of an accelerator pedal operated by the driver, and changes said threshold value for switching so that a range in which traveling is performed in said second traveling mode is increased as a learned value indicative of a result of such learning is greater.

6. The hybrid vehicle according to claim 1, wherein
 said control apparatus learns an opening degree of an accelerator pedal operated by the driver, and changes said threshold value for switching so that a range in which traveling is performed in said first traveling mode is increased as a learned value indicative of a result of such learning is smaller.

7. A control method of a hybrid vehicle incorporating an internal combustion engine and an electric motor as motive power sources and being capable of switching, in accordance with a traveling state of the vehicle, between a first traveling mode where traveling is performed while said internal combustion engine is stopped and a second traveling mode where traveling is performed while said internal combustion engine and said electric motor are operated, the method comprising:
 a first step of learning driving characteristics during traveling for each driver whose identity has been determined; and
 a second step of changing a threshold value for switching between said first traveling mode and said second traveling mode in accordance with the driver, based on a result of such learning.

8. The control method of the hybrid vehicle according to claim 7, further comprising
 a third step of determining whether or not the vehicle is in a traveling condition where acceleration or deceleration is expected, wherein
 when it is determined that the vehicle is in said traveling condition, said threshold value for switching is changed in said second step.

9. The control method of the hybrid vehicle according to claim 8, wherein
 in said third step, whether or not the vehicle is in said traveling condition is determined based on a curve degree of a course of the vehicle.

10. The control method of the hybrid vehicle according to claim 8, wherein
 when it is determined that the vehicle is in said traveling condition, said driving characteristics are learned in said first step.

11. The control method of the hybrid vehicle according to claim 7, wherein
 in said first step, an opening degree of an accelerator pedal operated by the driver is learned, and
 in said second step, said threshold value for switching is changed so that a range in which traveling is performed in said second traveling mode is increased as a learned value indicative of such learning is greater.

12. The control method of the hybrid vehicle according to claim 7, wherein
 in said first step, an opening degree of an accelerator pedal operated by the driver is learned, and
 in said second step, said threshold value for switching is changed so that a range in which traveling is performed in said first traveling mode is increased as a learned value indicative of such learning is smaller.

13. A non-transitory computer readable recording medium recording a program configured to cause a computer to execute control of a hybrid vehicle incorporating an internal combustion engine and an electric motor as motive power sources and being capable of switching, in accordance with a traveling state of the vehicle, between a first traveling mode where traveling is performed while said internal combustion engine is stopped and a second traveling mode where traveling is performed while said internal combustion engine and said electric motor are operated, the program comprising:
- a step of learning driving characteristics during traveling for each driver whose identify has been determined; and
- a step of changing a threshold value for switching between said first traveling mode and said second traveling mode in accordance with the driver, based on a result of such learning.

14. The hybrid vehicle according to claim 1, wherein the control apparatus learns driving characteristics based on an opening degree of an accelerator pedal or on traveling power or traveling torque.

15. The control method of the hybrid vehicle according to claim 7, wherein
said first step learns driving characteristics based on an opening degree of an accelerator pedal or on traveling power or traveling torque.

16. The non-transitory computer readable recording medium according to claim 13, wherein
said learning step learns driving characteristics based on an opening degree of an accelerator pedal or on traveling power or traveling torque.

* * * * *